Jan. 31, 1950 T. T. BALDT 2,496,192
AUTOMATIC VEHICLE LOADER
Filed Dec. 13, 1946 5 Sheets-Sheet 5
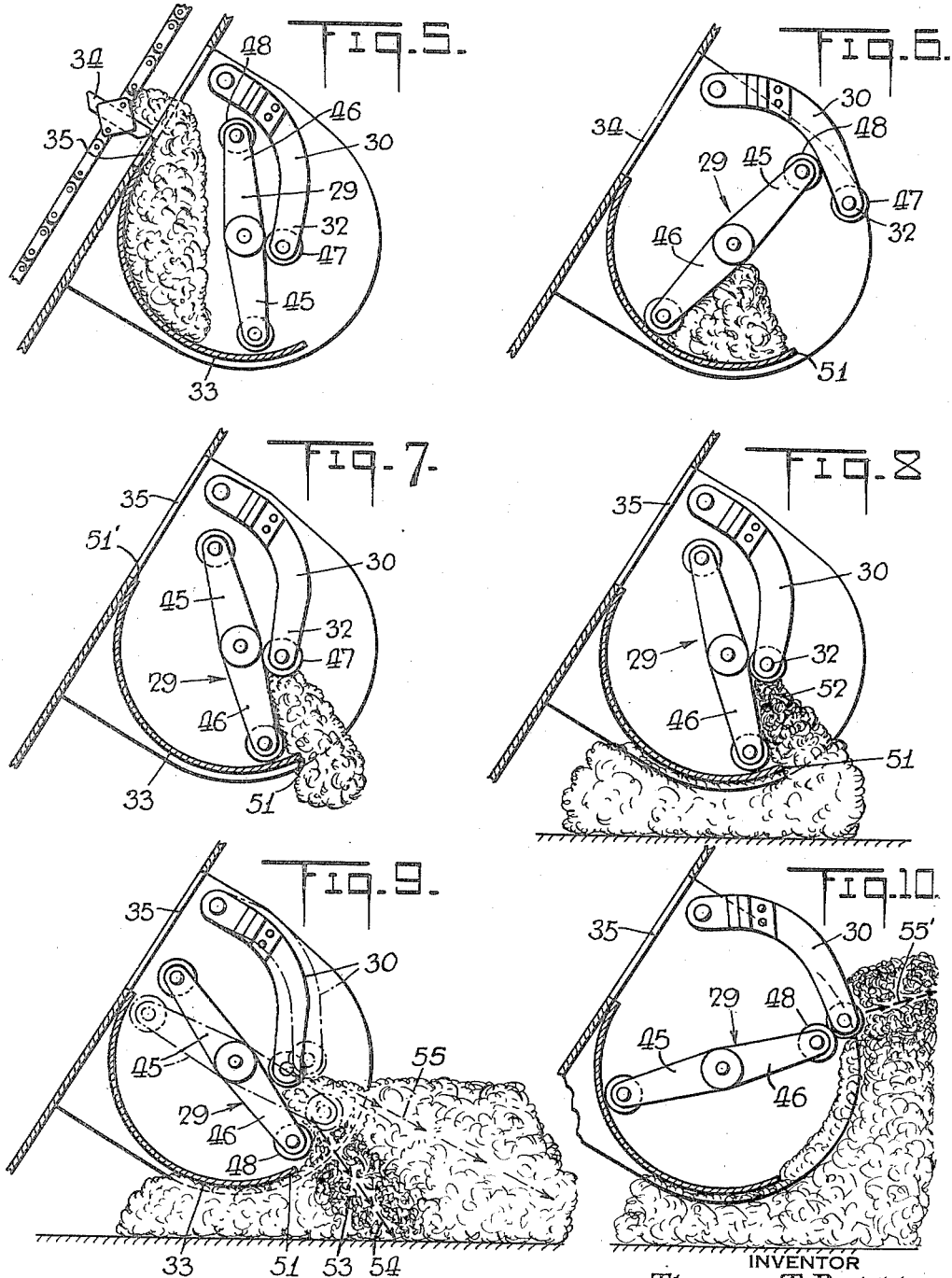
INVENTOR
Thomas T. Baldt
BY George H. Mitchell
ATTORNEY Patented Jan. 31, 1950

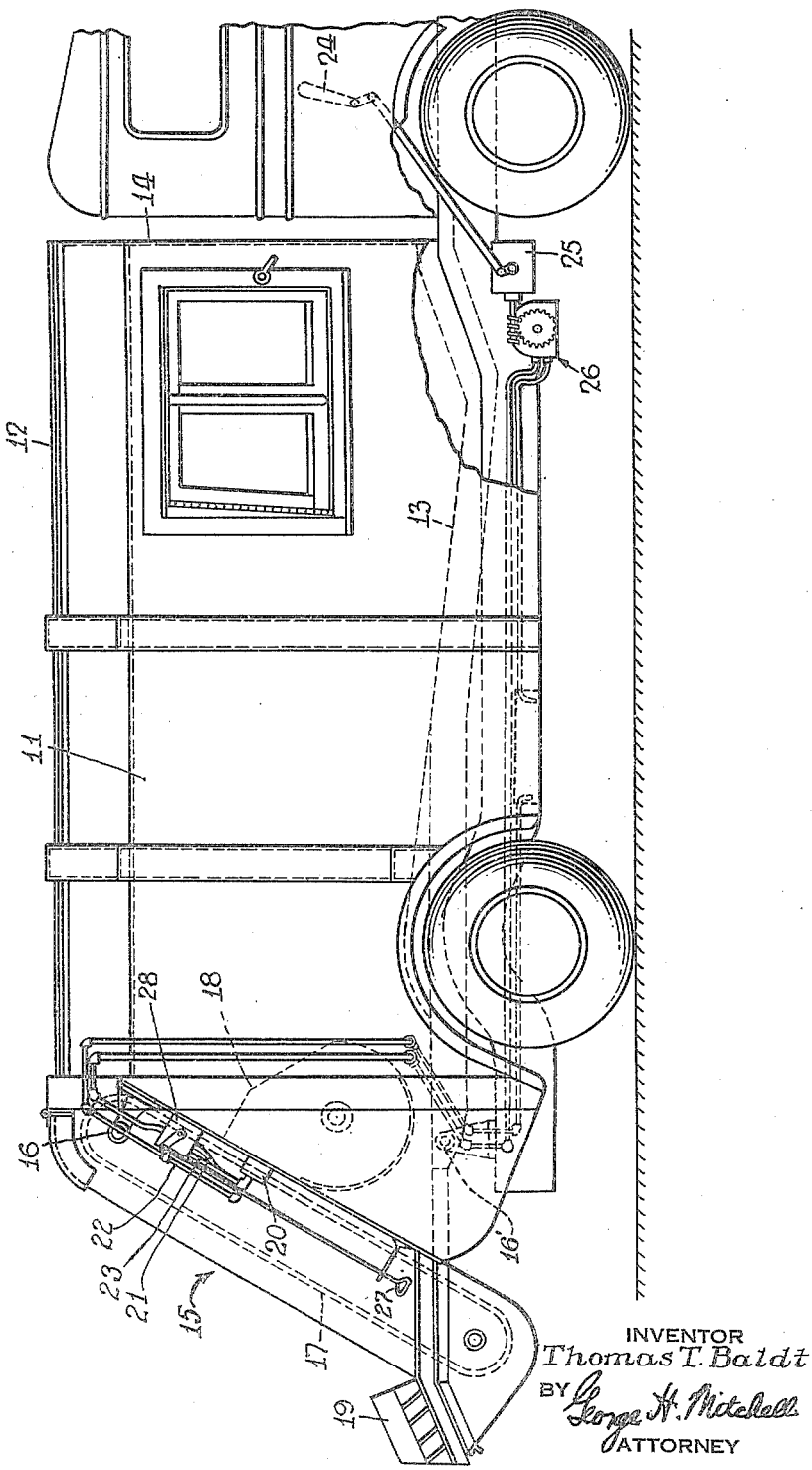

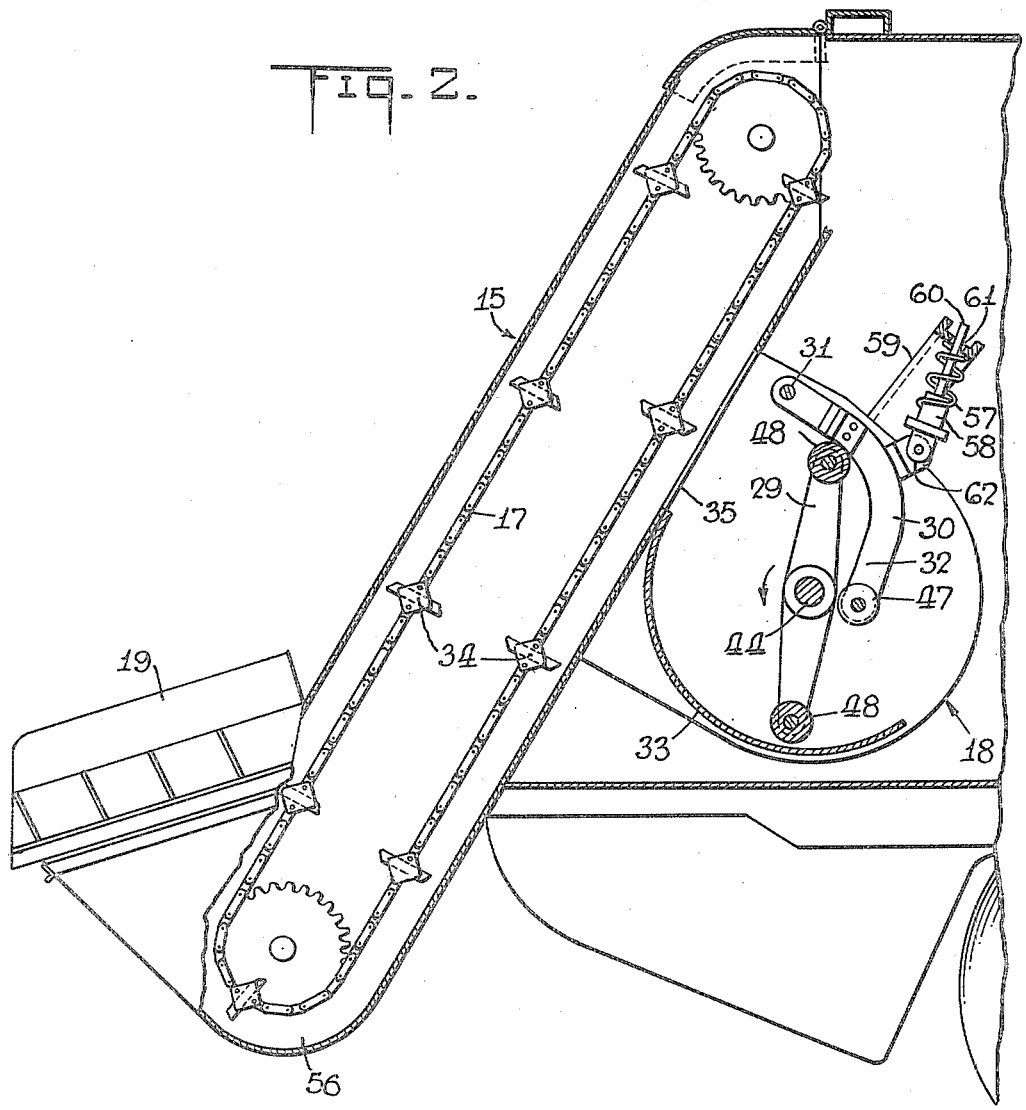

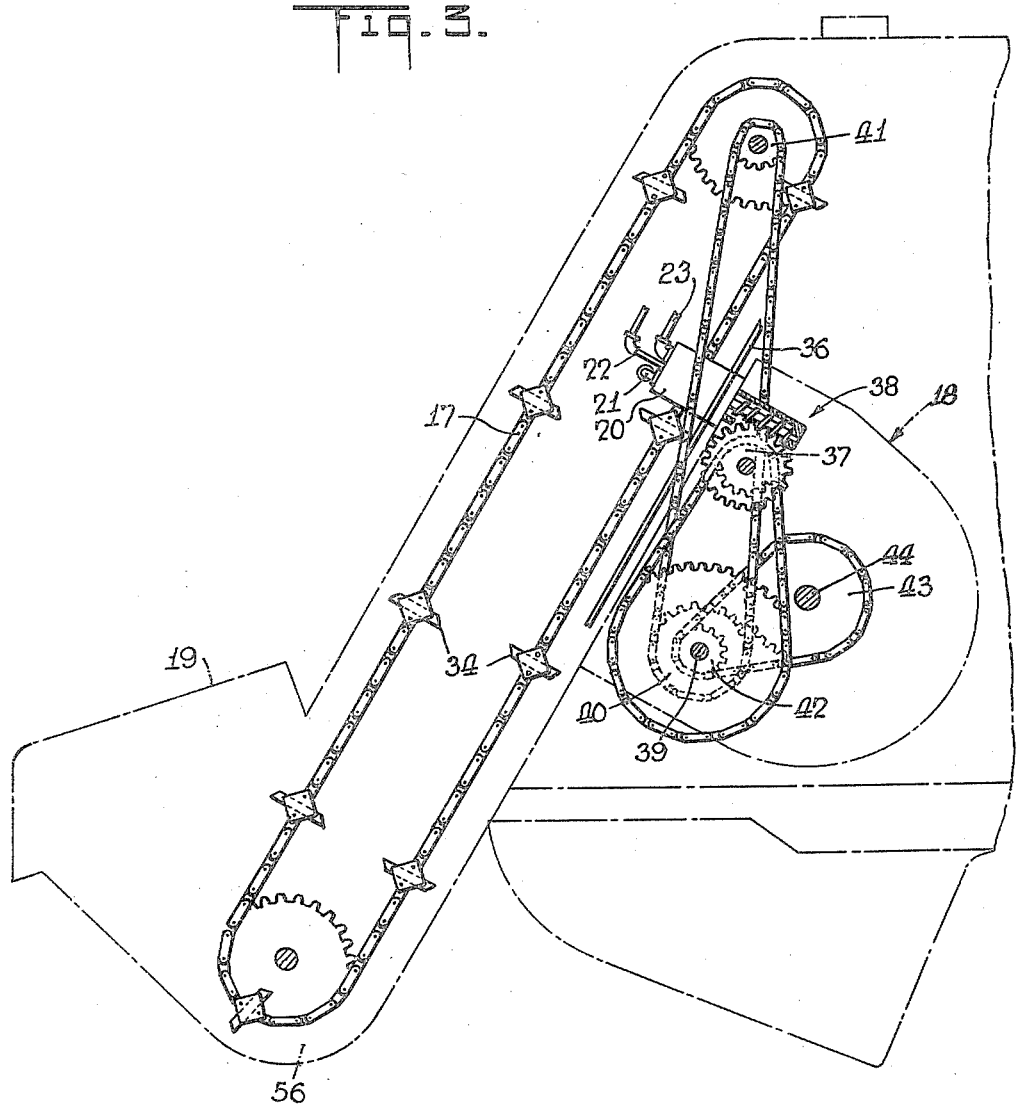

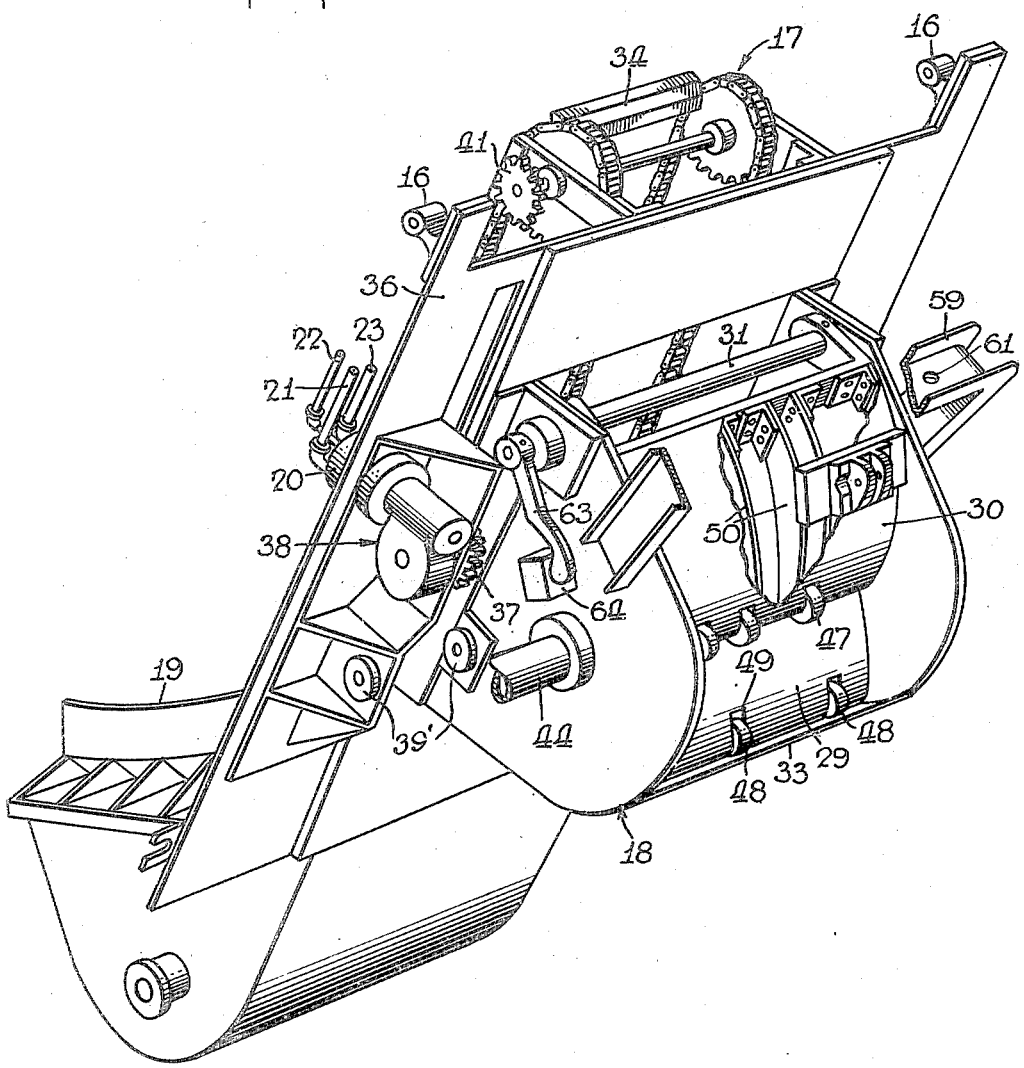

2,496,192

UNITED STATES PATENT OFFICE 2,496,192

AUTOMATIC VEHICLE LOADER

Thomas T. Baldt, Springfield Gardens, N. Y.

Application December 13, 1946, Serial No. 715,924

14 Claims. (Cl. 214—67)

My invention relates to automatic packing and loading devices, and in particular to improved methods and mechanisms for loading a refuse-collection vehicle.

Many schemes have been proposed for increasing the loading efficiency of automatically loaded refuse or garbage trucks. These schemes have employed means for evenly distributing garbage over the floor of the vehicle or for packing it against one of the sides or ends. In most cases, these mechanisms have been large, clumsy, and extensive—covering either the entire length or width or both of the vehicle.

It is, accordingly, an object of my invention to provide an improved automatic loading and and packing device of the character indicated.

It is another object to provide means for automatically compressing refuse in a garbage truck, whereby the truck may handle a greater load of refuse than is now customary.

It is also an object to increase the efficiency of loading a garbage truck and at the same time to reduce the complexity and size of the loading mechanism.

Still another object is to provide an automatic loading-and-packing mechanism that may be readily and removably installed on one of a plurality of refuse-collection vehicles.

Other objects and various further features of the invention will be pointed out or will occur to those skilled in the art from a reading of the following specification in conjunction with the accompanying drawings. In said drawings:

Fig. 1 is a vertical side view of a refuse-collection vehicle to which an automatic loading-and-packing device according to the invention has been applied;

Fig. 2 is an enlarged side view of the loading attachment of Fig. 1, with parts broken away and parts in section in order to illustrate functional features;

Fig. 3 is another enlarged side view of the loader of Fig. 1, emphasizing drive mechanisms for the parts shown in Fig. 2;

Fig. 4 is a perspective view of my loading attachment as it appears when removed from the truck (certain elements, such as brackets and chains, are omitted to simplify this figure, and some parts have been broken away to illustrate details of construction); and Figs. 5 through 10 schematically illustrate a possible explanation for the efficiency with which my loading device has been found to work.

Broadly speaking, my invention contemplates a simple two-element packing mechanism comprising a bladed rotor or scoop functioning at a substantially constant speed of rotation, and a packing paddle pivotally supported near the rotor and including a portion extending into wiping contact with the blade of the rotor. In the specific form to be described, a flight attachment is employed for periodically loading a relatively small bin, and the bladed rotor acts periodically to scoop or sweep out this bin so as to discharge its contents within the loading volume of the truck.

Although it is not at present completely understood how the paddle and rotor cooperate to produce efficient packing, it is believed that in addition to performing the scooping function the rotor cams the paddle radially outwardly so as to produce strong radial forces for compressing refuse or the like material. This compressing function occurs most efficiently after the vehicle has been partially loaded, so that the more the vehicle is loaded the greater is the density of refuse deposited on the top of the accumulated pile. This heavier accumulation at the top of the pile serves further to compress the initial relatively light accumulations. Thus, when fully loaded, the truck carries a well-compressed mass of relatively uniform high density.

Referring to the drawings, my invention is shown in application to a conventional garbage or refuse truck having a large covered loading volume defined by side walls 11, a top 12, a floor 13, an end wall 14, and by my loading attachment, which may be carried by the tail gate 15. The tail gate 15 is shown inclined with respect to the end of the vehicle, and it may be pivotally supported on hinges 16 at the top of the back end of the vehicle. When loaded, the attachment 15 may be swung vertically about the hinges 16 and the loaded volume then dumped, as by tilting the body about another set of rear hinges 16'.

The loading attachment may comprise an endless conveyor flight 17 for feeding refuse to a packer 18. The flight 17 may be fed through a conventional hopper or chute 19. In order to simplify the mechanism, both the flight 17 and the packer 18 may be operated by a hydraulic motor 20 fed by a suitable supply and relief piping system 21, 22, 23 from a hydraulic pump, which may be operated by a power take-off from the motor for the vehicle. In the form shown, a first control lever 24 located in the cab of the vehicle operates a clutch mechanism 25 for supplying take-off power to suitable reduction gearing 26 for the hydraulic pumping mechanism. A second control lever 27 which may be located on the tailgate, controls a reversing valve mechanism 28

(also shown on the tailgate) for alternating the functions of the pressure-supply piping 21—23 so as to reverse the conveyor flight 17—as when bulky objects jam the flight.

In accordance with the invention the dual functions of packing and loading are effected through a simple mechanism consisting essentially of two elements—a bladed rotor or scoop 29 and a paddle 30. In the form shown, the rotor 29 is generally flat and is rotated about an axis midway between its extremities so as to define a two-bladed rotor. The paddle element 30 is pivotally supported at 31 close by the rotor 29; it includes a projecting portion 32 for substantially continuous wiping contact with the blades of the rotor 29. For most continuous wiping contact, the paddle 30 is preferably generally arcuately formed with a radius substantially that of the radial extent of one of the blades of the rotor 29, and the concave side of the paddle 30 faces generally toward the rotor axis. The effective length and arrangement of paddle 30 are preferably such that it may always ride on an oncoming surface of the rotor or scoop 29.

In the sense depicted in the drawings, the rotor 29 is driven counterclockwise. Twice for each rotation, it sweeps the arcuate floor of a bin 33 into which the conveyor flight 17 periodically drops relatively small isolated masses of refuse. Preferably, the timed relation between conveyor-flight speed and rotor speed is such that with each passage of one of the flight paddles 34 past the entrance 35 to the bin 33, the rotor 29 completes a half revolution.

As indicated above in a general way, the drive for the flight 17 and for the rotor 29 may be simple and entirely carried by the assembly which pivots from the vehicle on the hinges 16. Pressurized fluid is delivered to the hydraulic motor 20 by suitable supply lines 21—23, which may include readily detachable flexible hoses. The motor 20 is mounted directly on the frame or base plate 36 of the loading attachment 15 so as to drive a sprocket 37 through suitable reduction gearing 38. In the form shown, the sprocket 37 drives an idler or distribution shaft 39 (journalled as at 39′) at a still further reduced speed, and direct connection is made from the distribution shaft 39 to the flight 17 and to the rotor 29 via sprockets 40—41 and sprockets 42—43, respectively.

The paddle 30 extends from its pivotal support 31 to a point preferably slightly below the rotor drive shaft 44. This relationship means that an operating cycle will comprise first a contact of the paddle extremity 32 with the rotor 29 near the pivotal axis of the latter. As the rotor 29 is displaced counterclockwise, the tip 32 slides radially outward over the face of one of the rotor blades 45 until an extreme position is reached, with the tip of the blade 45 supporting the tip 32 of the paddle 30. Upon further rotation of the rotor 29, the tip of the blade 45 slides along the concave part of the paddle 30, gradually permitting the paddle 32 to descend until the tip 32 contacts the blade 46 near the center of the rotor. The cycle thus repeats itself with each passage of a blade 45 or 46 past the paddle, or twice for each revolution of the rotor 29. In order to promote smoothness of operation, anti-friction means may be provided at the extremities of either the paddle member 30 or the rotor member 29. In the form shown this anti-friction means is applied to both the paddle and the rotor in the form of rollers 47—48 supported in recessed portions 49 of these members. For utmost freedom of operation, the rollers 47—48 project preferably beyond the extremities and other functional surfaces of the members 29—30.

In order that the described structure may be light and yet strong, the members 29—30 may be built-up sections, with internal reinforcement ribs 50, as shown in Fig. 4 for the paddle member 30. The reinforcement ribs 50 may be covered with relatively light sheet material to form smooth surfaces for easy operation. The rollers 47—48 may be journalled on common shafts (not shown) carried by the reinforcement members 50 near the extreme ends of the paddle and rotor members 30 and 29.

As indicated above, it is not entirely clear at the present time how or why my packing-and-loading device operates so effectively. However, a suggested explanation may be useful to a more complete understanding of the invention. In Fig. 5, the blade rotor 29 and the paddle member 30 are shown at the instant when a new charge of refuse is being deposited through the opening 35 to the bin 33 by one of the flight paddles 34. The timing is preferably such that the charge of refuse is completely unloaded from the flight paddle 34 before the end of the oncoming blade 46 closes off the opening 35. Whether or not such synchronization occurs, the blade 46 passes in such clearance relation with the arcuate wall of the bin 33 that it serves as a scoop, to compress the charge of refuse into a sector shape as shown in Fig. 6.

Assuming that the loading space within the refuse-collecting vehicle is relatively empty, the next function of the rotor 29 will be to push the charge of refuse past the lower lip 51 of the bin so that this increment may begin the formation of accumulation of a pile of refuse (see Fig. 7). The lower lip 51 is preferably about 30 degrees past the vertical plane which includes the axis of rotor 29, and the upper or inlet lip 51′ of the bin 33 is substantially tangent to the trough in which the flight paddles 34 convey refuse upwards.

After a small quantity of refuse has accumulated, say, up to the lower lip of the bin 33, succeeding charges of refuse will not merely drop beyond the lip 51. Fig. 8 illustrates such a condition for the Fig. 7 relationship of rotor and blade members 29—30. As the rotor 29 continues to move counterclockwise, the relatively frictionless contact between the blade 46 and the tip 32 of the paddle 30 results in an outward camming of the paddle 30 and in a wedged displacement of the ram-like end 32 of the paddle 30. This displacement is generally radially outward along the surface of the blade 46 which is supporting the latest charge of refuse. The resulting action may be a local compression of the refuse (particularly of this latest charge—note the more densely shaded portion 52), and the force of this compression may be directed generally radially outwardly of the rotary axis of the blade member 29. With successive increments of charge, the radial compression becomes greater until for the lowest angles beyond the lip 51 of the bin 33 the refuse may be said to be so densely compacted as to cause parts or substantially all of succeeding charges to be squashed or pushed upward and into the loaded mass, in radial directions still further displaced from the lip 51 of the bin.

This action of radially compacting at successively higher displacements from the lip 51 of the bin 33 is illustrated in Fig. 9, where an extremely dense portion 53 of the accumulated mass is shown for the radial direction 54 (heavy arrows). When the packing in the direction 54 becomes so dense as not to permit of further packing, the greatest packing forces will be exerted on new charges of refuse along more elevated directions extending generally radially from the axis of the rotor 29, as for example along the direction 55 (light dot-dash arrows for the dot-dash relation of members 29—30 in Fig. 9).

As the vehicle becomes more loaded, the greatest compressional forces exerted on incoming charges of refuse will occur at successively higher angles beyond the lip 31 of the bin 33, and the limit of this action will occur when the concave surface of the paddle 30 begins to ride on the roller 38 at the end of the rotor 29 (see Fig. 10). Preferably, the design and relative location of the paddle 30 and of the rotor 29 is such that this terminal direction 55' of generally radial compression represents an angle of fill extending high into the loading volume of the vehicle. In this manner it will be clear that most effective use is made of the space available for loading.

It will be appreciated that accompanying the exertion of radial compressional forces there is not only a compacting of refuse so as to produce a higher-density fill but also a forcible generally horizontal displacement of partially and fully compacted refuse. This displacement is first directed forward along the floor 13 of the loading space and extends to the forward wall 14 thereof. After the floor has been covered, it will be understood that the same action results in substantially uniform horizontal distribution and compacting of refuse for successive higher angles of fill, until for a fully loaded truck the load extends substantially throughout the loading space. It will further be understood that, concurrent with the tendency to produce an evenly distributed load, there is the effect of well-compacted high-density upper loads to mat down lower layers of less density so as to produce a further compression of the lower layers—such further compression resulting from the shear integrated mass of the well-compacted (and, hence, high density) upper layers.

Thus far, operation of my packing and loading device has been described for the assumption that the refuse handled is not so bulky as to foul the mechanism. In practice I have found that my packer-loader members 29—30 may be designed strong enough and that they may be driven with sufficient power to handle any load that the flight paddles 34 may deliver to the entrance 35 of the bin or hopper 33. However, occasionally such bulky articles as small logs, and the like may jam the flight 17, particularly at the lower bend 56 thereof. To relieve such congestion it is desirable to reverse the loading and packing mechanism, as by operation of the hand lever 27, and it will be understood that the blade member 29 then rotates in a reversed or clockwise sense. Refuse which may have been in the bin 33 or is just being discharged into the same will then be carried by a blade of the rotor 29 in the reversed direction, and parts thereof may become wedged between the end of the rotor blade and the concave part of the paddle 30, resulting in an abnormally high upward swing of the paddle. To limit this abnormally high swing, I provide resilient means in the nature of a shock absorber. Preferably, this shock absorber acts substantially only with the paddle 30 swung abnormally high—in other words it only operates for short periods, when the loading mechanism is running reversed.

The shock absorber may comprise helical spring means 57 resiliently urging a spool or stud 58 against the convex or back side of the paddle 30. The other end of the spring 57 may be urged against and, if desired, held by a reinforcement structure 59, which is shown formed of channel stock secured to the sides of the bin 33. In the form shown, a projection 60 of the stud 58 is slidably received in an aperture 61 in the channel member 59, and the part which abuts the paddle 30 is arcuately formed so as to provide abutment surfaces 62 for the well-distributed application of shock-absorbing forces to the paddle 30, as will be clear.

In the normal operation of my packing and loading elements 29—30, the end 32 of the paddle 30 may descend rather rapidly into contact with the blade member 29 near the rotary axis thereof. In order that this descent may have a minimum destructive or damaging effect, I provide additional shock-absorbing means for dampening such descent. This additional shock absorber may include a crank arm 63 fixedly carried by the shaft 31 for the paddle 30. Preferably, just before the paddle end 32 contacts the blade rotor 29, the end of the crank 63 is intercepted by a resilient member as, for example, a rubber or Neoprene block 64, mounted by means of a suitable bracket (not shown) to a side of the bin 33.

It will be appreciated that I have described an extremely simple mechanism for packing and loading loose material such as refuse into a given container, storage, or loading volume. Simplicity of the parts makes for a relatively light structure, which can be formed with a conveyor flight into a single unit; and the structure may be readily removed as a unit, for servicing or for replacement purposes. Compactness of the attachment makes possible utilization of greater loading volumes within existing vehicles, and this fact combined with greater packing efficiency may account for the ability of my device to load vehicles to two to three times the capacity possible with conventional machines.

While I have described my invention for the preferred form shown, it will be understood that modifications may be made within the scope of the invention as defined by the claims which follow.

I claim:

1. In a refuse truck, a body for holding refuse, a tailgate hingedly mounted to said body, an endless conveyor carried by said tailgate for elevating refuse with respect to said body, a loading hopper at the lower end of said tailgate for feeding refuse to said conveyor, a bin carried by said tailgate in a position to receive refuse elevated by said conveyor, a rotary scoop for scooping refuse in said bin with substantially continuous rotation, and a paddle pivotally mounted above said scoop and in wiping contact therewith, said paddle being of a length and so arranged that it may always ride on an oncoming surface of said scoop.

2. A unitary refuse loader and packer to be applied to a refuse truck, comprising an endless conveyor for elevating refuse, a hopper for loading said conveyor, a bin to receive refuse discharged by said conveyor, rotatable scooping means in said bin for periodically scooping refuse, with a rotary motion, packing means for periodically compressing successive scooped masses of refuse, and driving means including a motor connected to continuously drive both said conveyor and said scooping means, whereby said loaderand-packer unit may, as a unit, be readily and removably applied to a refuse truck.

3. In an automatic refuse-loading device, a bin, means for feeding refuse into said bin, a rotary scoop in said bin for periodically scooping isolated masses of refuse for discharge into a container, and a paddle pivotally supported above said scoop and having a portion extending into wiping contact with said scoop on the discharge side of the rotary axis of said scoop, said paddle being of an effective length always to ride freely on an oncoming surface of said scoop.

4. In a loading attachment for a refuse vehicle, an endless conveyor flight, a bin having an opening to receive refuse delivered by said flight, a pivoted blade for sweeping said bin with a rotary motion, means for continuously rotating said blade, and a paddle pivotally supported above said blade and in substantially continuous wiping contact therewith to one side of the vertical plane including the rotary axis of said blade, said paddle being of an effective length always to ride inclined against an oncoming surface of said blade.

5. In a packing device of the character indicated, a substantially flat blade member, means for substantially continuously rotating said blade member about an axis intermediate its ends, whereby said blade member is in effect a two-bladed rotor, and a paddle member pivotally supported above the axis for said blade member, said paddle member including a concave generally arcuate portion extending into continuous wiping contact with said blade member, and being of an effective radial length substantially that of the spacing between axes of said blade and paddle members, and shock-absorbing means associated with said paddle member for preventing excessive pounding of said paddle member on said blade member.

6. In a packing device of the character indicated, a blade, means for continuously rotating said blade, and a paddle pivotally supported above the axis of said blade and including a portion extending into wiping contact with said blade, said paddle being of an effective length to ride inclined against an oncoming surface of said blade, whereby the motion of said paddle is oscillatory about its pivotal support, and resilient means for resiliently limiting oscillatory displacements of said paddle.

7. In a packing device of the character indicated, a blade member, means for continuously rotating said blade member, whereby said blade is effectively a scoop, a paddle member pivotally supported above the rotary axis of said blade member and including a portion extending into wiping contact with said blade member, said paddle member being of an effective length always to ride inclined against an oncoming surface of said blade member, and anti-friction means carried by the radial extremities of one of said members for reducing friction in said wiping contact.

8. A device according to claim 7, in which said anti-friction means includes a plurality of roller wheels recessed into said radial extremity and projecting radially therebeyond.

9. In a packing device, a generally flat blade member, means for rotating said blade member about an axis intermediate the ends thereof, whereby said blade member is in effect a double-bladed rotor, and a paddle pivotally supported above said blade member and including a generally cylindrically arcuate portion in wiping contact with said blade member with the concave side of said paddle facing the rotary axis of said blade member, said paddle having an effective radial length of the order of magnitude of the spacing between axes of said blade member and of said paddle.

10. A packing device according to claim 9, in which the axis of pivotal support for said paddle is offset to one side of the vertical plane passing through the rotary axis of said blade member, said offset being in the direction away from the wiping contact of said blade and paddle members.

11. A packing device according to claim 9, in which the concave surface of said paddle has a radius substantially equal to the maximum extent of said blade member about its rotary axis.

12. In a packing device of the character indicated, a revoluble blade, means for substantially continuously rotating said blade, and a paddle pivotally supported near said blade with said paddle urged into wiping contact with said blade, said paddle being of a sufficient length to ride against an oncoming surface of said blade.

13. In a packing device or the like, a blade, means for substantially continuously rotating said blade about a longitudinally extending axis, and a paddle pivotally supported on an axis generally parallel to the rotary axis of said blade, said axes being spaced by an amount exceeding the radial extent of said blade, and said paddle extending from its axis by an amount exceeding the separation between said axes.

14. In a device of the character indicated, a revoluble blade, a bin having an arcuate surface to be swept by said blade, and a paddle pivotally supported near said blade and of length sufficient to be cammed by said blade radially outward along said blade as said blade is rotated, the arcuate surface of said bin extending substantially to the angle of said blade at which such camming contact may commence, whereby with the radially outward displacement of said paddle along said blade refuse newly scooped by said blade may be radially rammed against an accumulated compacted mass of refuse already discharged from said bin.

THOMAS T. BALDT.

REFERENCES CITED

The following references are of record in the file of this patent:

UNITED STATES PATENTS

| Number | Name | Date |
|---|---|---|
| 1,405,952 | Stuart | Feb. 7, 1922 |
| 2,151,894 | Cambessedes | Mar. 28, 1939 |
| 2,212,058 | Wood | Aug. 20, 1940 |
| 2,335,155 | Lee | Nov. 23, 1943 |
| 2,371,540 | Mott | Mar. 13, 1945 |
| 2,430,973 | Boissonnault | Nov. 18, 1947 |

FOREIGN PATENTS

| Number | Country | Date |
|---|---|---|
| 469,136 | Great Britain | July 20, 1937 |
| 792,162 | France | Oct. 14, 1935 |